US006914551B2

(12) United States Patent
Vidal

(10) Patent No.: US 6,914,551 B2
(45) Date of Patent: Jul. 5, 2005

(54) APPARATUS AND METHOD TO FACILITATE UNIVERSAL REMOTE CONTROL

(75) Inventor: Alberto Vidal, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 530 days.

(21) Appl. No.: 10/122,056

(22) Filed: Apr. 12, 2002

(65) Prior Publication Data

US 2003/0193426 A1 Oct. 16, 2003

(51) Int. Cl.[7] .......... H04L 29/00
(52) U.S. Cl. .......... 341/176; 340/825.24; 340/825.25; 348/734
(58) Field of Search .......... 341/176; 340/825.22; 345/666; 348/734

(56) References Cited

U.S. PATENT DOCUMENTS 6,130,726 A * 10/2000 Darbee et al. .......... 348/734
6,133,847 A * 10/2000 Yang .......... 340/825.22
6,211,856 B1 * 4/2001 Choi et al. .......... 345/666
2001/0045819 A1 * 11/2001 Harris et al.

* cited by examiner

*Primary Examiner*—Michael Horabik
*Assistant Examiner*—Hung Dang
(74) *Attorney, Agent, or Firm*—Park, Vaughan & Fleming, LLP

(57) ABSTRACT

A universal remote control, which includes a display screen and a user input mechanism. The universal remote control also includes a processing unit that is configured to display information on the display screen and to accept selection data from the user input mechanism. The universal remote control additionally includes a wireless communication mechanism that is configured to provide communications between the processing unit and an appliance or computer program running on a computer system. The appliance provides information to be displayed on the display screen, and information entered through the user input mechanism is communicated to the appliance. Since the appliance provides the information to be displayed on the display screen and also interprets the entries on the input mechanism, the universal remote control needs no special knowledge about the appliance.

29 Claims, 3 Drawing Sheets

APPARATUS AND METHOD TO FACILITATE UNIVERSAL REMOTE CONTROL

BACKGROUND

1. Field of the Invention

The present invention relates to remote controls. More specifically, the present invention relates to an apparatus and a method to facilitate a just-in-time universal remote control for controlling multiple appliances.

2. Related Art

Modern appliances typically include a remote control that allows the user to control the functions of the appliance without having to go to the appliance. Remote controls for complex appliances such as home stereo systems or video disk players have myriad buttons and switches to control the many functions of the appliance. While all of these buttons and switches are necessary for complete control of the appliance, users typically use only a small subset of the total controls on the remote control. The controls that are not normally used clutter the remote control and can cause confusion to the user when trying to locate a seldom-used feature.

Users are also confronted with multiple remote controls, one for each remotely controllable appliance in the home, such as a television, a video tape player, a video disk player, a stereo system, and a home device control system. Remote controls from different manufacturers can have widely different user interfaces, which can also lead to user confusion even after selecting the proper remote control device.

Manufacturers have created so-called universal remote controls, which can be trained to mimic several remote controls, and can then control each appliance for which they have been trained. While universal remote controls attempt to address the problem of multiple remote controls, these devices are even more complex to operate, further confusing the user. Additionally, a universal remote control may not be able to duplicate every command sequence designed into a remote control designed for the appliance, and for future appliances.

Hence, users must spend time learning a new remote control or programming an existing universal remote control each time they purchase a new remotely controllable appliance, which detracts from the enjoyment of using the appliance after it is first purchased.

What is needed is an apparatus and a method to provide remote control over multiple appliances without the difficulties described above.

SUMMARY

One embodiment of the present invention provides a universal remote control, which includes a display screen and a user input mechanism. The universal remote control also includes a processing unit that is configured to display information on the display screen and to accept selection data from the user input mechanism. The universal remote control additionally includes a wireless communication mechanism that is configured to provide communications between the processing unit and an appliance. The appliance provides information to be displayed on the display screen, and information entered through the user input mechanism is communicated to the appliance. Since the appliance provides the information to be displayed on the display screen and also forwards the entries on the input mechanism, the universal remote control needs no special knowledge about the appliance.

In one embodiment of the present invention, the universal remote control includes a touch screen, which functions as the display screen and the user input mechanism.

In one embodiment of the present invention, the universal remote control includes a discovery mechanism that is configured to manually discover the appliance through an entry on the user input mechanism.

In one embodiment of the present invention, the universal remote control includes a discovery mechanism that is configured to automatically discover the appliance through the wireless communication mechanism.

In one embodiment of the present invention, the discovery mechanism includes a Bluetooth™ discovery mechanism. Bluetooth™ is a trademark owned by Bluetooth SIG, Inc.

In one embodiment of the present invention, the wireless communication mechanism is configured to receive information to be displayed on the display screen in a markup language.

In one embodiment of the present invention, the markup language includes extensible markup language (XML) or hypertext transport protocol (HTTP).

In one embodiment of the present invention, a set of standard graphical representations of appliance-control mechanisms is stored in the remote control to choose for display to the user by the appliance.

In one embodiment of the present invention, the set of graphical representations of appliance-control mechanisms is stored in the appliance and can be sent over the wireless communications link to the remote control for display to the user.

In one embodiment of the present invention, the appliance includes a plurality of appliances.

In one embodiment of the present invention, the plurality of appliances includes one or more of a television, a video tape player, a video disk player, a stereo, a home control system, and a computer system with remotely controllable software (for example: a DVD player, a CD player, an MP3 player, or slideshow presentation software). Note that this application is not restricted to only electronic appliances, but could also be used to control programs and functions that run on a computer system. For example, the remote control can be used to control DVD, CD or MP3 player software running on a computer.

One embodiment of the present invention provides a system that facilitates configuring a remote control to operate an appliance. The system operates by sending a request for a specification of a user interface from the remote control to the appliance. In response to the request, the system receives the specification for the user interface from the appliance and configures the remote control to implement the user interface so that a user can operate the appliance.

In one embodiment of the present invention, the user can navigate through a number of user interfaces by consecutive uses of the system.

In one embodiment of the present invention, the user can switch between appliances using a list of currently active appliances maintained by the remote control.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Controlling Multiple Devices

Figure 1:
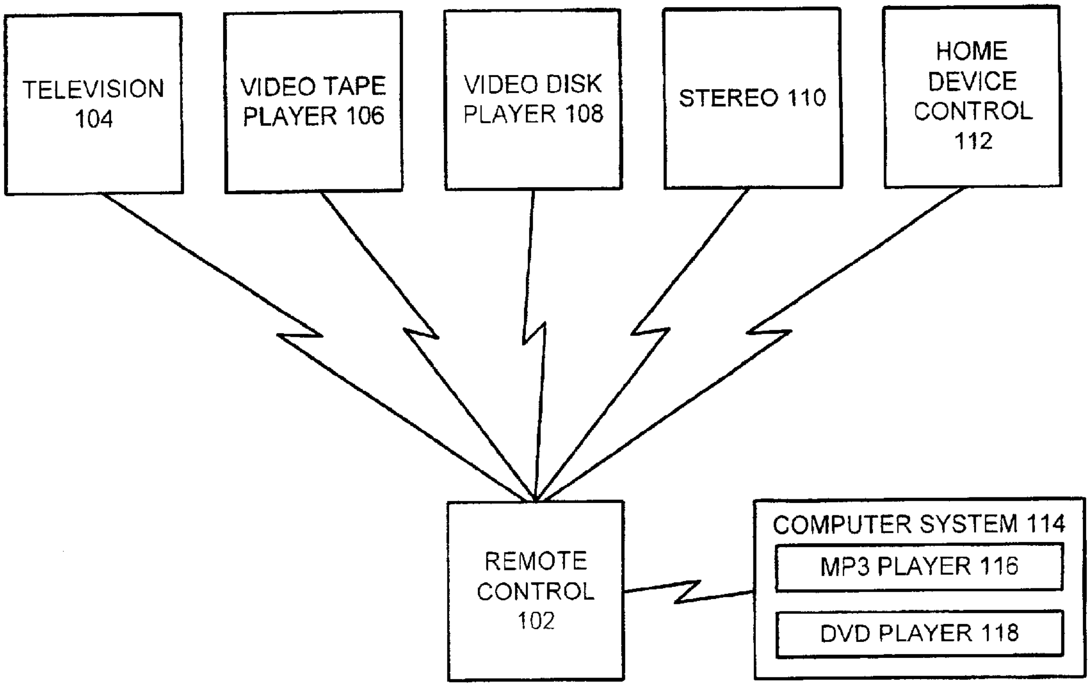
FIG. 1 illustrates remote control 102 controlling multiple devices in accordance with an embodiment of the present invention.

FIG. 1 illustrates remote control 102 controlling multiple appliances in accordance with an embodiment of the present invention. Remote control 102 communicates with television 104, video tape player 106, video disk player 108, stereo 110, home device control 112, and computer system 114 across a wireless communication channel such as an infrared channel or a radio frequency (RF) channel.

Computer system 114 can generally include any type of computer system, including, but not limited to, a computer system based on a microprocessor, a mainframe computer, a digital signal processor, a portable computing device, a personal organizer, a device controller, and a computational engine within an appliance. Computer system 114 can execute multiple programs, two of which are shown: MP3 player 116 and DVD player 118.

Remote control 102 discovers these appliances using either a manual discovery mechanism or an automatic discovery mechanism across the wireless communication channel as described below in conjunction with FIG. 5. The wireless communication channel can be an infrared channel or a radio frequency channel such as a Buetooth™ communication channel. The appliances discovered by the remote control are displayed on the remote control as described below in conjunction with FIG. 2.

When a user selects an appliance to control at the remote control, the remote control sends a message to the appliance requesting a menu description. In response, the appliance returns the menu description to the remote control. The remote control then displays the menu.

Appliance Selection

Figure 2:
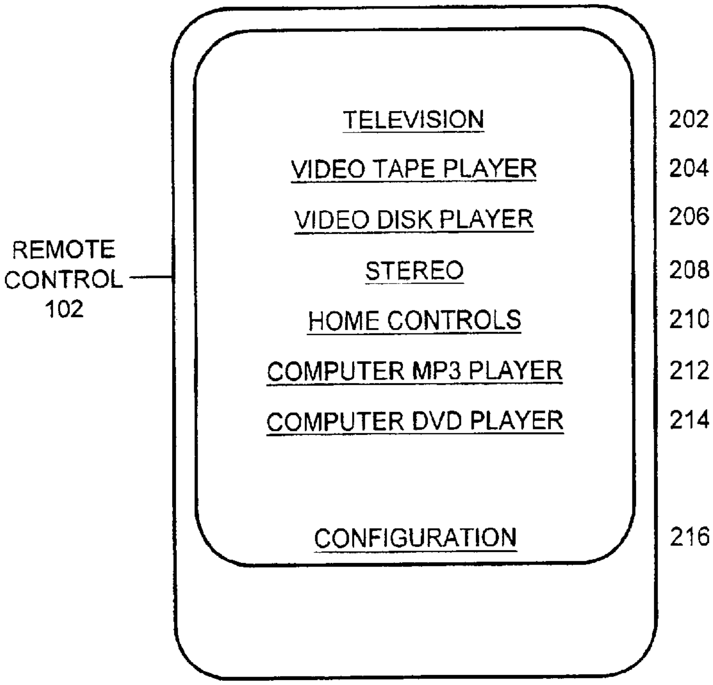
FIG. 2 illustrates an appliance selection page on remote control 102 in accordance with an embodiment of the present invention.

FIG. 2 illustrates an appliance selection page on remote control 102 in accordance with an embodiment of the present invention. Remote control 102 has discovered television 104, video tape player 106, video disk player 108, stereo 110, home device control 112, computer MP3 player 116, and computer DVD player 118. Remote control 102 displays these devices on a display such as a touch screen. For example, remote control 102 displays television on line 202, video tape player on line 204, video disk player on line 206, stereo on line 208, home controls on line 210, computer MP3 player on line 212, and computer DVD player on line 214. Additionally, configuration is shown on line 216. Note that the individual appliances determine what is displayed for that appliance, therefore, the appliance can also display an icon such as the manufacturer's logo, user instructions, or an advertising message on remote control 102. This description uses the convention that selectable items on remote control 102 are underlined. Any convention understandable by the user can be used.

Selecting configuration causes the remote control to display a configuration page (not shown). This configuration page can be used to provide manual discovery as well as to provide setup options such as contrast control for the display. Selecting an appliance, for example video tape player 106, causes the remote control to request the primary menu from video tape player 106. In response to the request, the appliance returns a specification for the menu. This specification can be encoded in a markup language such as extensible markup language (XML) or hypertext transport protocol (HTTP)

Appliance Control

Figure 3:
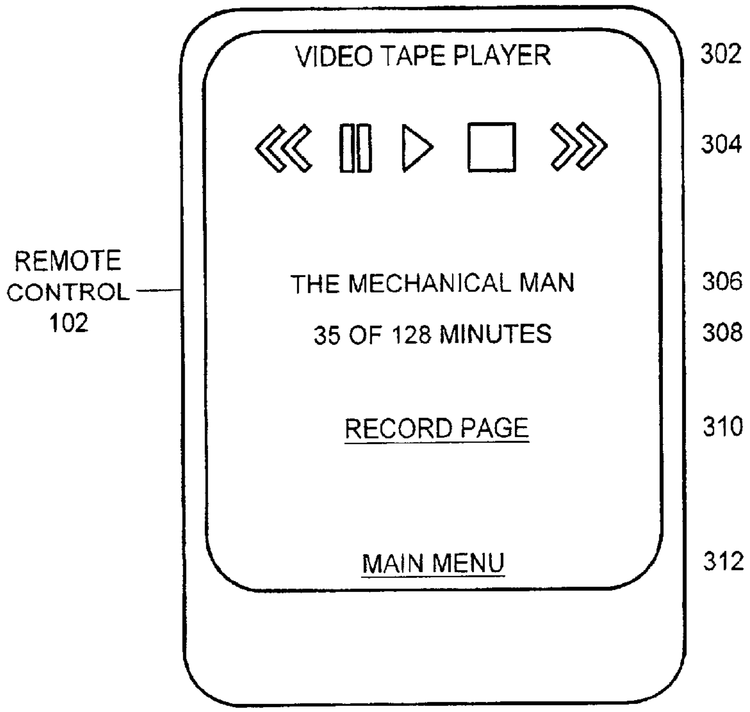
FIG. 3 illustrates an appliance control page on remote control 102 in accordance with an embodiment of the present invention.

FIG. 3 illustrates an appliance control page on remote control 102 in accordance with an embodiment of the present invention. The user selected video tape player 106 on the appliance selection page. In return, video tape player 106 returned a specification for its primary menu. Remote control 102 then interpreted this specification and displayed the primary menu for video tape player 106 as shown in FIG. 3. Line 302 displays the selected device so the user can tell at a glance which device is selected. Line 304 displays the standard symbols for controlling the device. From left to right, these symbols are: rewind, pause, play, stop/eject, and fast-forward. A limited number of standard images representing common appliance control symbols can reside in nonvolatile memory on the remote control 102 or a custom image representing a symbol can be downloaded from video tape player 106. Selecting one of these symbols causes remote control 102 to send a message to video tape player 106 requesting the selected function.

Line 306 displays the title of the current movie being played, while line 308 displays the progress within the movie. Lesser-used functions of video tape player 106, such as recording functions are on a separate menu page. Line 310 can be used to select the record page. When the record page is selected, remote control 102 sends a message to video tape player 106 requesting the record page. Video tape player 106 responds with the specification of the record page, which is displayed as described above for the main appliance page. Line 312 displays main menu and can be used to return to the appliance selection page.

Remote Control 102

Figure 4:
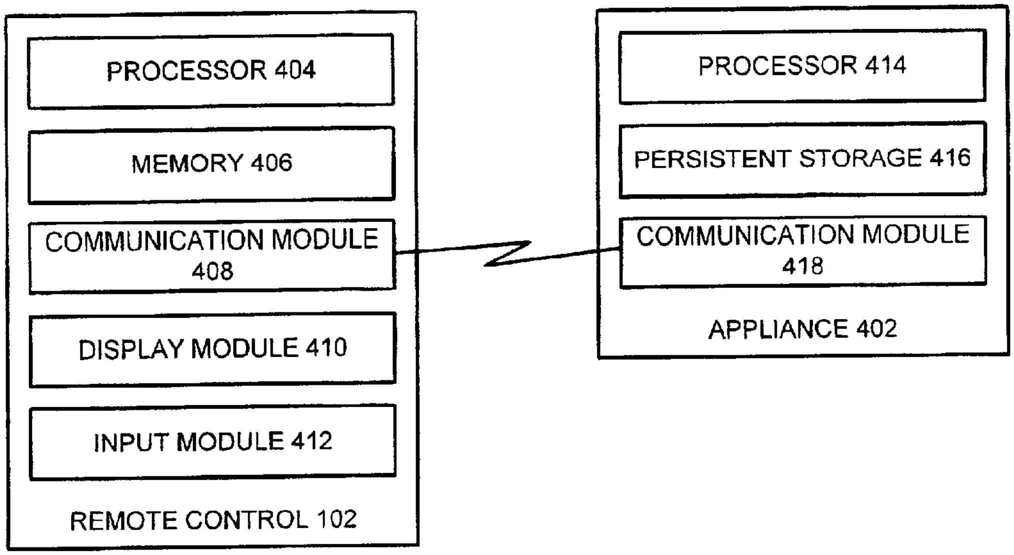
FIG. 4 illustrates remote control 102 in accordance with an embodiment of the present invention.

FIG. 4 illustrates remote control 102 in accordance with an embodiment of the present invention. Remote control 102 includes processor 404, memory 406, communication module 408, display module 410, and input module 412. Remote control 102 communicates with appliance 402. Appliance 402 includes processor 414, persistent storage 416, and communication module 418.

Processor 404 provides computer processing for remote control 102. Processor 404 can generally include any type of processor, including, but not limited to, a microprocessor, a microcontroller, a digital signal processor, a personal organizer, a device controller, and a computational engine within an appliance.

Memory 406 includes both volatile and nonvolatile storage. Non-volatile storage can include any type of memory that can hold data when remote control 102 is powered down. This includes, but is not limited to, magnetic storage, flash memory, ROM, EPROM, EEPROM, and battery-backed-up RAM. Memory 406 includes program instructions for processor 404 and persistent storage for symbols and the like.

Communication module 408 provides wireless communications with the various appliances, for example appliance 402. Communication module 408 can generally include any type of wireless communication channel capable of coupling together enabled devices. This wireless communication channel can include an infrared communication link or a RF link such as a Bluetooth™ RF link but is not limited to these.

Display module 410 displays information to a user of remote control 102. The information can be displayed on an appropriate display device such as a liquid crystal display (LCD) of a touch screen. Input module 412 accepts inputs from a user of remote control 102 and supplies these inputs to processor 404. The user can supply inputs through an entry mechanism such as buttons or a touch screen.

Appliance 402 includes processor 414, persistent storage 416, and communication module 418. Processor 414 can generally include any type of processor, including, but not limited to, a microprocessor, a digital signal processor, a personal organizer, a device controller, and a computational engine within an appliance. Processor 414 provides computing power to appliance 402 and includes the capability to communicate with remote control 102 through communication module 418.

Persistent storage 416 provides storage for display specifications for remote control 102. These display specifications can include specifications in a markup language such as extensible markup language (XML) or hypertext transport protocol (HTTP).

Communication module 418 provides wireless communications with remote control 102. Communication module 418 can generally include any type of wireless communication channel capable of coupling together enabled devices.

When remote control 102 is first powered, and periodically thereafter, processor 404 causes communication module 408 to broadcast a discovery command. Appliances, such as appliance 402, that receive this discovery command respond to the discovery command to inform remote control of their existence and possibly to send unique display information such as the manufacturer's logo. Upon receiving these responses, remote control 102 displays an entry on the appliance selection page. If more appliances respond than can fit on a single page, remote control 102 can provide multiple appliance selection pages including navigation icons on the appliance selection pages for switching between pages.

After selecting an appliance from the appliance selection page, remote control 102 communicates with the appliance, for example appliance 402, to download menu specifications to remote control 102 and to provide responses from remote control 102 to appliance 402.

Appliance Discovery

Figure 5:
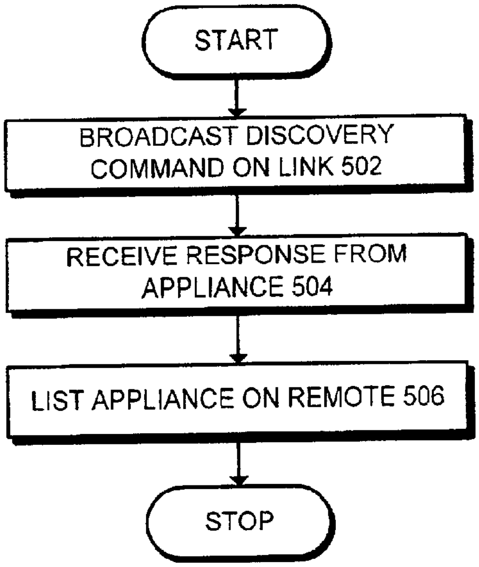
FIG. 5 is a flowchart illustrating the process of discovering available appliances in accordance with an embodiment of the present invention.

FIG. 5 is a flowchart illustrating the process of discovering available appliances in accordance with an embodiment of the present invention. The system starts when remote control 102 broadcasts a discovery command from communication module 408 (step 502). Next, remote control 102 receives a response from one or more appliances at communication module 408 (step 504). Finally, remote control 102 displays the device name, as specified by the appliance, on the appliance selection page (step 506). This process can be repeated until no more appliances respond to the discovery command. Appliances previously discovered do not need to be rediscovered at a later use of the remote control. The remote control remembers previously discovered appliances and can engage in communication as soon as the appliance comes within range or becomes available. If a previously discovered appliance is not currently within range or is unavailable, the name of the appliance may be grayed out or temporarily removed from the appliance list. An appliance list management menu is provided by the remote control to be able to delete no longer used appliances from the main menu as well as to change other remote control settings.

Menu Display

Figure 6:
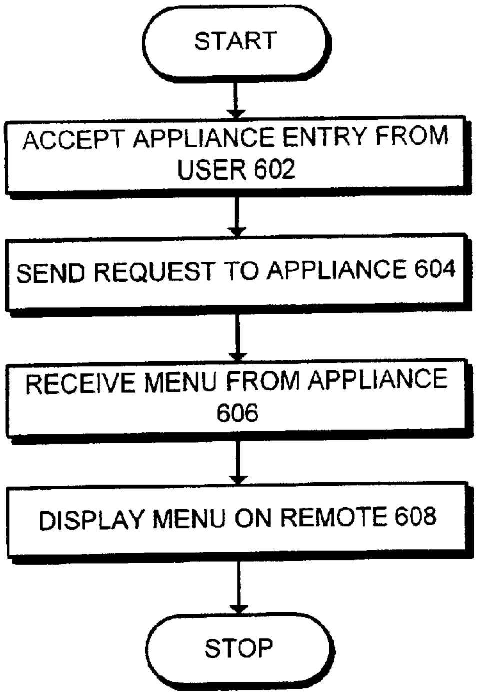
FIG. 6 is a flowchart illustrating the process of selecting and receiving an appliance menu in accordance with an embodiment of the present invention.

FIG. 6 is a flowchart illustrating the process of selecting and receiving an appliance menu in accordance with an embodiment of the present invention. The system starts when input module 412 of remote control 102 receives an appliance entry from a user (step 602). The user makes this entry by pressing a button or touching a touch screen. Next, communication module 408 transmits a request to communication module 418 in appliance 402 requesting a menu specification (step 604). In response, appliance 402 returns a menu specification coded in a markup language such as XML or HTTP (step 606). Finally, display module 410 displays the menu on remote control 102 (step 608). Note that icons presented on remote control 102 can be stored in memory 406 or can be received by communication module 408 from appliance 402.

Controlling an Appliance

Figure 7:
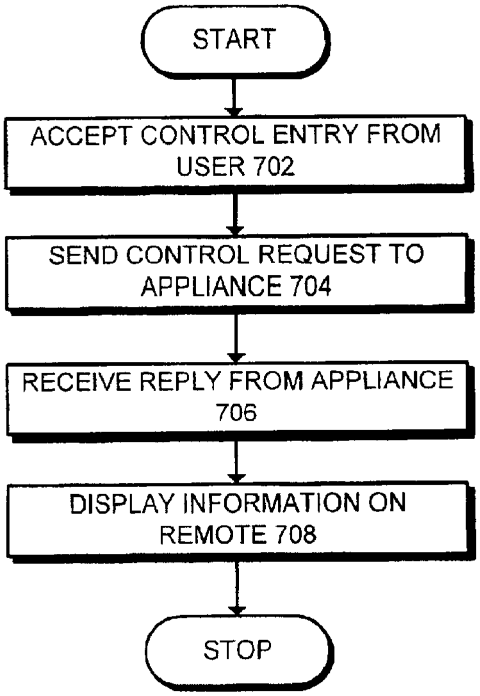
FIG. 7 is a flowchart illustrating the process of controlling an appliance in accordance with an embodiment of the present invention.

FIG. 7 is a flowchart illustrating the process of controlling an appliance in accordance with an embodiment of the present invention. The system starts when input module 412 accepts a control entry from a user (step 702). This control entry can be entered by pressing a button or touching a touch screen. Next, communication module 408 sends a control request to appliance 402 (step 704). In response, appliance 402 performs the requested action and optionally sends a reply to remote control 102. Communication module 408 receives the reply from appliance 402 (step 706). Finally, display module 410 displays updated information on remote control 102 (step 708). The updated information can include a secondary menu or can be information related to the current function, for example, the title of a movie being played and the playing time of the movie.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A universal remote control, comprising:

a display screen;

a user input mechanism;

a processing unit configured to display information on the display screen and to accept selection data from the user input mechanism;

a wireless communication mechanism configured to provide communications between the processing unit and an appliance; and a requesting mechanism configured to request a user-interface menu from the appliance that is specific to the appliance to display on the display screen;

wherein the menu is customized for a current state of the appliance; and wherein the processing unit is further configured to accept information through the user-interface menu that is entered through the user input mechanism for communication to the appliance.

2. The universal remote control of claim 1, further comprising a touch screen, wherein the touch screen includes the display screen and the user input mechanism.

3. The universal remote control of claim 1, further comprising a discovery mechanism that is configured to discover the appliance through an entry on the user input mechanism.

4. The universal remote control of claim 1, further comprising a discovery mechanism that is configured to discover the appliance through the wireless communication mechanism.

5. The universal remote control of claim 4, wherein the discovery mechanism includes a Bluetooth™ discovery mechanism.

6. The universal remote control of claim 1, wherein the wireless communication mechanism includes a receiving mechanism within the universal remote control that is configured to receive information to be displayed on the display screen in a markup language.

7. The universal remote control of claim 6, wherein the markup language includes extensible markup language (XML) or hypertext transport protocol (HTTP).

8. The universal remote control of claim 1, wherein a set of standard graphical representations of appliance-control mechanisms is stored in the universal remote control to choose for display to a user by the appliance.

9. The universal remote control of claim 8, wherein the set of standard graphical representations of appliance-control mechanisms is stored in the appliance and can be sent over a wireless communications link to the universal remote control for display to the user.

10. The universal remote control of claim 1, wherein the appliance includes a plurality of appliances.

11. The universal remote control of claim 10, wherein the plurality of appliances includes one or more of a television, a video tape player, a video disk player, a stereo, a home control system, and a computer system with remotely controllable software.

12. A method for configuring a remote control to operate an appliance, comprising:

sending a request for a specification of a user interface from the remote control to the appliance;

in response to the request, receiving the specification for the user interface from the appliance, wherein the specification provides a user-interface menu that is customized for a current state of the appliance; and configuring the remote control to implement the user interface to operate the appliance.

13. The method of claim 12, wherein a user can navigate through a number of user interfaces by consecutive uses of the remote control.

14. The method of claim 12, wherein a user can switch between appliances using a list of currently active appliances maintained by the remote control.

15. The method of claim 12, further comprising sending the request for the specification of the user interface on a wireless communication link.

16. The method of claim 15, further comprising receiving the specification of the user interface on the wireless communication link.

17. The method of claim 16, wherein the wireless communication link includes a Bluetooth™ communication link.

18. The method of claim 12, wherein the specification is encoded in a markup language, wherein the markup language includes extensible markup language (XML) or hypertext transport protocol (HTTP).

19. The method of claim 12, further comprising discovering the appliance using a Bluetooth™ discovery mechanism.

20. The method of claim 12, wherein the appliance includes a plurality of appliances.

21. The method of claim 20, wherein the plurality of appliances includes one or more of a television, a video tape player, a video disk player, a stereo, a home control system, and individual software programs running on a computer system.

22. A computer-readable storage medium storing instructions that when executed by a computer cause the computer to perform a method for configuring a remote control to operate an appliance, the method comprising:

sending a request for a specification of a user interface from the remote control to the appliance;

in response to the request, receiving the specification for the user interface from the appliance, wherein the specification provides a user-interface menu that is customized for a current state of the appliance; and configuring the remote control to implement the user interface to operate the appliance.

23. The computer-readable storage medium of claim 22, the method further comprising sending the request for the specification of the user interface on a wireless communication link.

24. The computer-readable storage medium of claim 23, the method further comprising receiving the specification of the user interface on the wireless communication link.

25. The computer-readable storage medium of claim 24, wherein the wireless communication link includes a Bluetooth™ communication link.

26. The computer-readable storage medium of claim 22, wherein the specification is encoded in a markup language, wherein the markup language includes extensible markup language (XML) or hypertext transport protocol (HTTP).

27. The computer-readable storage medium of claim 22, the method further comprising discovering the appliance using a Bluetooth™ discovery mechanism.

28. The computer-readable storage medium of claim 22, wherein the appliance includes a plurality of appliances.

29. The computer-readable storage medium of claim 28, wherein the plurality of appliances includes one or more of a television, a video tape player, a video disk player, a stereo, and a home control system.

* * * * *